(12) United States Patent
Bohner et al.

(10) Patent No.: US 6,612,393 B2
(45) Date of Patent: Sep. 2, 2003

(54) STEERING SYSTEM FOR MOTOR VEHICLES

(75) Inventors: Hubert Bohner, Boeblingen (DE); Rainer Freitag, Owen (DE); Mathias Hartl, Kernen (DE); Wolfgang Schrock, Esslingen (DE); Tobias Speidel, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/052,674

(22) Filed: Jan. 17, 2002

(65) Prior Publication Data

US 2002/0092696 A1 Jul. 18, 2002

(30) Foreign Application Priority Data

Jan. 17, 2001 (DE) .......................................... 101 01 827

(51) Int. Cl.⁷ ................................................ B62D 5/00
(52) U.S. Cl. ....................... 180/405; 180/406; 180/407; 180/402; 180/403
(58) Field of Search ................................. 180/405, 406, 180/407, 446, 421, 402, 403; 701/42, 43

(56) References Cited

U.S. PATENT DOCUMENTS

| 6,138,788 | A | * | 10/2000 | Bohner et al. ............... 180/405 |
| 6,220,385 | B1 | * | 4/2001 | Bohner et al. ............... 180/403 |
| 6,279,675 | B1 | * | 8/2001 | Bohner et al. ............... 180/403 |
| 6,283,243 | B1 | * | 9/2001 | Bohner et al. ............... 180/406 |
| 6,336,519 | B1 | * | 1/2002 | Bohner et al. ............... 180/403 |

* cited by examiner

Primary Examiner—Daniel G. DePumpo
Assistant Examiner—Tony Winner
(74) Attorney, Agent, or Firm—Kenyon & Kenyon

(57) ABSTRACT

A steering system functions in accordance with the "steer by wire" concept and has a normal operating system without positive coupling between the steering handle and the steered vehicle wheels, as well as an emergency operating system, which functions with positive coupling between the steered vehicle wheels and the steering handle. An auxiliary operating system is additionally provided, which, in response to malfunctions of the normal operating system, assumes its tasks and, in a transitional phase, adapts the performance characteristics of the steering system to those of the emergency system, which is switched on upon conclusion of the transitional phase. Thus, at the transition from the normal operating system to the emergency operating system, the driver is given time to become accustomed to the other steering performance.

21 Claims, 4 Drawing Sheets

STEERING SYSTEM FOR MOTOR VEHICLES

FIELD OF THE INVENTION

The present invention relates to a steering system for motor vehicles having a normal operating system, as well as an emergency operating system which automatically becomes active in response to a malfunction of the aforementioned system. The normal operating system includes a steering-angle setpoint generator that is actuatable by a steering handle, in particular by a steering hand wheel, a steering-angle actual-value sensor, or position feedback encoder, actuated by steered vehicle wheels, a motorized control unit controlling the steered vehicle wheels, as well as a control system which controls the control unit in accordance with a setpoint-actual value comparison of the steering angle. Between the steering handle and the steered vehicle wheels, the emergency operating system includes a mechanical and/or hydraulic positive coupling which is active at least in response to emergency mode.

BACKGROUND INFORMATION

Steering systems of the aforementioned type, in which the "steer-by-wire" concept is implemented, are fundamentally known and are being further developed with substantial outlay to facilitate series production in the near future.

To date, two lines of development have been pursued.

In accordance with the one development line, in the event of a malfunction of the normal operating system, which is continually monitored for correct operation, a hydraulic or mechanical positive coupling between the steering handle and steered vehicle wheels, which is inactive during normal mode, is switched into action. Thus, in the event of emergency mode, an, in theory, conventional steering is at hand.

The other development line provides for an optionally multiply redundant configuration of the normal operating system, in order to ensure adequate safety under all conceivable operating conditions.

It is an object of the present invention to provide a steering system which is distinctly improved from the standpoint of safety.

SUMMARY

The above and other beneficial objects of the present invention are achieved by providing a steering system as described herein. According to one example embodiment of the present invention, a steering system of the type mentioned at the outset includes an auxiliary system, which is at least substantially redundant relative to the normal operating system and which, in response to malfunctions in the normal operating system, automatically becomes or remains active and, in a transitional phase, adapts the operating characteristics of the steering system to the operating mode of the emergency system, which becomes active when the transitional phase comes to an end or when the adaptation has been effected.

The present invention is based on the realization that the systems described at the outset are still deficient as far as safety is concerned.

The normal operating system, which functions without any positive coupling between the steering handle and steered vehicle wheels, routinely exhibits clearly different operating characteristics than those of the emergency operating system working with positive coupling. This may be due, for example, to the normal operating system having a steering angle transmission ratio which deviates from that of the emergency operating system, between the adjusting displacement of the steering handle and the associated steering angle variations of the steered vehicle wheels. Moreover, the normal operating system may function in dependence upon parameters, in such a way that, in response to critical driving states, automatic steering corrections are undertaken largely without the driver's involvement. If the need arises, at this point, to switch on the emergency operating system at an instant when the normal operating system is working with a steering angle transmission ratio that deviates considerably from that of the emergency operating system or when it seeks to perform an automatic steering correction, the driver may suddenly be overwhelmed, since he/she may steer the vehicle using only the emergency operating system.

Operating systems, which, due to multiple redundancy, are able to maintain the habitual operating characteristics of the steering system, even in an emergency, encourage the driver to ignore possible malfunction indications for a length of time. The result, therefore, for an extended period of time, is merely a system having diminished or even no redundancy, so that each additional malfunction entails a substantial safety hazard.

The present invention is based on the general idea that, in the event of a malfunction of the normal operating system, one switches over, with a time delay, to an emergency operating system that is quite safe, the driver being given the opportunity during the time delay, to get used to the performance characteristics of the emergency operating system, in that the performance characteristics of the steering system continuously approach those of the emergency operating system.

In accordance with the present invention, the auxiliary operating system, which is provided for carrying out the transitional phase and is designed to be at least substantially redundant relative to the normal operating system, carries on the function of the normal operating system for a limited time only, approximately up until completion of an autonomous steering intervention or engagement previously initiated by the normal operating system. Then, it gradually familiarizes the driver more and more with the operating mode of the emergency operating system.

The present invention utilizes the redundancy given by the normal operating system and the auxiliary operating system, in a completely new way, namely to make the transition to an extremely safe emergency operating system.

On the one hand, this arrangement ensures that the driver notices a malfunction of the normal operating system. On the other hand, the driver is prevented from being dangerously surprised when the emergency operating system is switched on.

One example embodiment of the present invention provides for the normal operating system to also control a manual-torque simulator, so that the driver senses a steering resistance, as in the case of a conventional steering operation. In this connection, it is provided in the transitional phase for the auxiliary system to gradually switch the manual-torque simulator more and more over to the manual torque of the emergency operating system so as to avoid an abrupt change in the manual torque when the emergency operating system is ultimately switched on.

In addition, it may be provided in the transitional phase for the auxiliary system to adjust the steerable vehicle wheels and the steering handle relatively to one another such that, given an active emergency operating system, the steering handle assumes a middle, i.e., normal position in the straight-ahead position of the steerable vehicle wheels.

DETAILED DESCRIPTION

Figure 1:
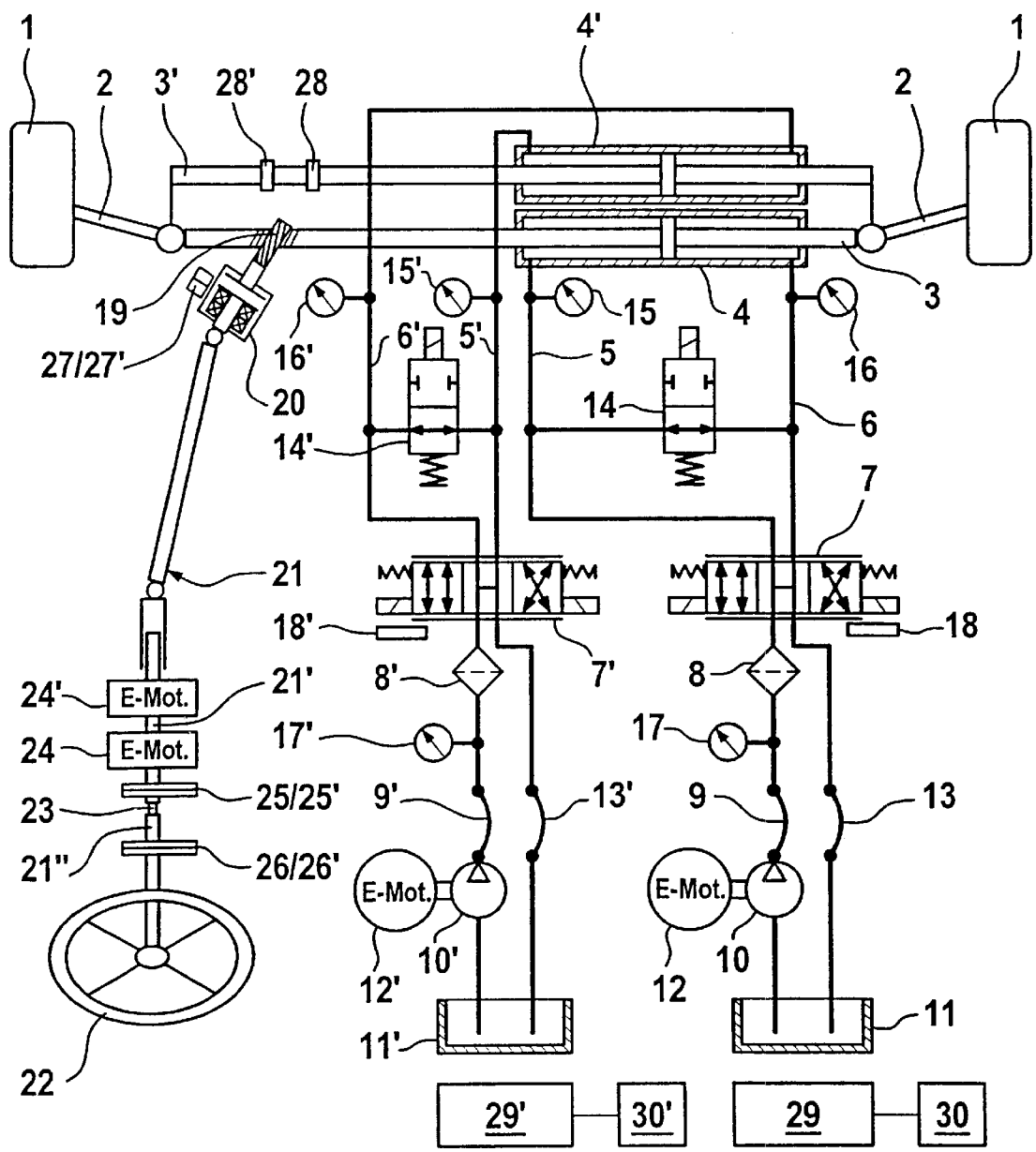
FIG. 1 is a schematic view of an example embodiment of the steering system according to the present invention.

A motor vehicle includes steerable front wheels 1, which are connected in fundamentally conventional manner via tie rods 2 and a connecting or intermediate rod 3 to one another to produce a common steering setting.

Provided in parallel to connecting rod 3 is a same type of connecting rod 3'.

Each of connecting rods 3 and 3' forms the piston rod of a dual-action piston-cylinder unit 4 and 4', respectively. These piston-cylinder units 4 and 4' are assigned to separate hydraulic circuits.

The two sides of piston-cylinder unit 4 are connected via lines 5 and 6 to the motor connections of a control valve 7, which is configured in the manner of a proportionally working 4/3 valve. A pressure connection of control valve 7 is connected via a filter 8 as well as a delivery pressure line 9 to the delivery side of a hydraulic pump 10, which is connected on the intake side to a relatively pressureless hydraulic reservoir 11 and is driven by an electric motor 12. A low-pressure connection of control valve 7 is connected via a low-pressure line 13 to reservoir 11. A normally open shutoff valve 14 is configured between lines 5 and 6. The pressures prevailing in lines 5, 6 and 9 may be detected by pressure sensors 15 through 17. A displacement or position sensor 18 is provided for recognizing the operating state of control valve 7.

The hydraulic circuit assigned to piston-cylinder unit 4' is configured in parallel to the hydraulic circuit of piston-cylinder unit 4 and, in principle, is constructed in the same manner. In this context, mutually corresponding elements in the two hydraulic circuits have the same reference numerals, which, in the case of the hydraulic circuit assigned to piston-cylinder unit 4' are marked by an accompanying prime, electric motor 12', e.g., having an electric current supply that is independent of electric motor 12.

One of connecting rods 3 and 3', in the illustrated example embodiment, connecting rod 3', is configured regionally as a steering rack, which mates with a pinion 19. This pinion 19 is connected via a normally closed coupling 20, as well as via a shaft train 21 connected thereto, to a steering hand wheel 22. Shaft train 21 includes a torsionally flexible element, such as a torsion bar 23, so that shaft parts 21' and 21" connected thereto rotate to a greater or lesser extent relatively to one another when shaft train 21 is subjected to torque.

Shaft part 21' is connected to two self-locking-free electric motors 24 and 24', i.e., forms the motor shaft of aforementioned motors 24 and 24'.

Assigned to each of shaft parts 21' and 21" are angle-of-rotation sensors 25, 25' and 26, 26', respectively. Mounted at coupling 20, acting in the manner of an end switch, are sensors 27, 27', which, given a completely open coupling 20, generate a signal to this effect.

Displacement sensors 28 and 28' are assigned to connecting rods 3 and 3'.

The steering system additionally includes two electronic control systems 29 and 29', which communicate with one another and are mutually redundant. They are connected on the input side to sensors 15 through 18, as well as to 25 through 28, and 15' through 18', as well as 25' through 28', respectively, and, on the output side, to control or governor valves 7 through 7', shift or command valves 14 and 14', as well as to coupling 20.

Control systems 29 and 29' are also connected on the input side to a sensory system 30 and 30', respectively, which may be used to sense various road-load parameters, such as the yaw velocity of the vehicle about its normal axis.

Control systems 29 and 29' may communicate via a master system, which, if indicated, is able to assume special functions, such as performing automatic steering maneuvers or steering corrections.

In normal mode, the steering system essentially works in the following manner:

In normal mode, control system 29 typically works, while control system 29' is switched to active standby state. In the process, shutoff valve 14 is forced into and retained in the closed position by control system 29, while control system 29' leaves shutoff valve 14' open. In addition, control system 29 holds coupling 20 in the open position, and continuously compares the signals of angle-of-rotation sensor 26 and of displacement sensor 28. Angle-of-rotation sensor 26 is controlled on the driver side by actuation of steering hand wheel 22 and inputs the steering angle desired by the driver, i.e., the steering-angle setpoint value desired on the driver side for steering the vehicle. Displacement sensor 28 senses the steering position of steered vehicle wheels 1, i.e., sensor 28 generates a signal corresponding to the steering-angle actual value.

As a function of the setpoint-actual value comparison of the steering angle, i.e., as a function of the signal difference between sensors 26 and 28, control system 29 controls control valve 7 in such a way that the set-point-actual value difference is compensated, and steered vehicles wheels 1 are steered in accordance with the driver-side adjustments of steering hand wheel 22. In the process, control system 29 may, if indicated, consider the signals from sensory system 30 and execute an automatic steering correction when the intention is, for example, for the actually occurring yawing of the vehicle about its normal axis to deviate from the steering maneuver desired on the driver side, i.e., from the yawing that is desired on the basis of the signal for the steering-angle setpoint value generated by angle-of-rotation sensor 26.

Furthermore, control system 29 controls electric motor 24 with the purpose of simulating a steering resistance. For this, control system 29 may evaluate the signals from pressure sensors 15 and 16 which are used to detect the pressure difference between the two sides of piston-cylinder unit 4 and, thus, the steering forces which are active at any one time. Analogously to these steering forces, electric motor 24 is driven to oppose a driver-side adjustment of steering hand wheel 22 with a resistance that is modulated in accordance with the actual steering forces. The extent of this resistance may be determined by comparing the signals of angle-ofrotation sensors 25 and 26 between which torsion bar 23 is situated, which is automatically twisted resiliently when the driver turns steering hand wheel 22 against the resistance of electric motor 24. Control system 29 is, therefore, able to determine the actually simulated steering resistance in each instance from the signals of sensors 25 and 26.

In normal mode, control system 29 continually checks the vehicle steering for error-free functioning.

In this connection, the movements of control valve 7 may be sensed by displacement sensor 18. Moreover, pressure sensors 15 and 16 may indicate a disappearing or, at most, slight pressure difference between the two sides of piston-cylinder unit 4 when control valve 7 is situated in the illustrated midposition. When, however, control valve 7 is adjusted in the direction of the one or other end position, a greater pressure difference may occur between pressure sensors 15 and 16 in the one or other direction.

The function of pump 10 may be detected by pressure sensor 17. The functioning of electric motor 24 may be derived from the signals of angle-of-rotation sensors 25 and which are used to detect the steering resistance simulated by electric motor 24. The open position of coupling 20 is signaled by sensor 27.

In addition, control system 29 monitors itself for error-free functioning.

Should an error occur, shutoff valve 14 is de-energized, so that the entire hydraulic circuit assigned to piston-cylinder unit 4 becomes inactive. At the same time, control system 29' assumes the further control work and, for that purpose, energizes shut-off valve 14', causing it to assume its closed position and allowing the hydraulic circuit assigned to control valve 7' to effectively function.

At this point, the function of the steering is at first continued in the same manner by control system 29', as described above in connection with control system 29. In particular, driver-independent steering maneuvers that had been automatically initiated up to that point, are concluded. In the following, the performance characteristics of the steering system are made to approximate those given by a mechanical positive coupling between steered vehicle wheels 1 and steering hand wheel 22.

As a general rule, when working with a mechanical positive coupling between steering hand wheel 22 and steered vehicle wheels 1, the steering angle transmission ratio differs from that of normal mode of the steering system, i.e., given a working control system 29. This is increasingly adapted or compensated for. At the same time, proper actuation of electric motor 24 makes the driver accustomed to a steering resistance, as in the case of a switched-on mechanical positive coupling.

Upon conclusion of the transitional phase, electric coupling 20 is disconnected from its electrical current supply, causing it to close, and the state of mechanical positive coupling is established between steered vehicle wheels 1 and steering hand wheel 22. Consequently, the emergency operating system produced by the mechanical positive coupling between steered vehicle wheels 1 and steering hand wheel 22 is switched on.

In this operating phase, control device 29' may then actuate electric motor 24' in the manner of a servomotor which assists the particular intended steering maneuvers of the driver at steering hand wheel 22:

Given a mechanical positive coupling between steered vehicle wheels 1 and steering hand wheel 22, manual torques at steering hand wheel 22 lead to a more or less great rotational deformation of torsion bar 23, so that angle-of-rotation sensors 25' and 26' register a more or less great angular difference. As a function of this angular difference, i.e., as a function of the manual torques occurring at steering hand wheel 22, electric motor 24' is driven with the purpose of reducing the manual torques to a greater or lesser extent, so that the steering maneuvers initiated on the driver side are assisted accordingly.

Figure 2:
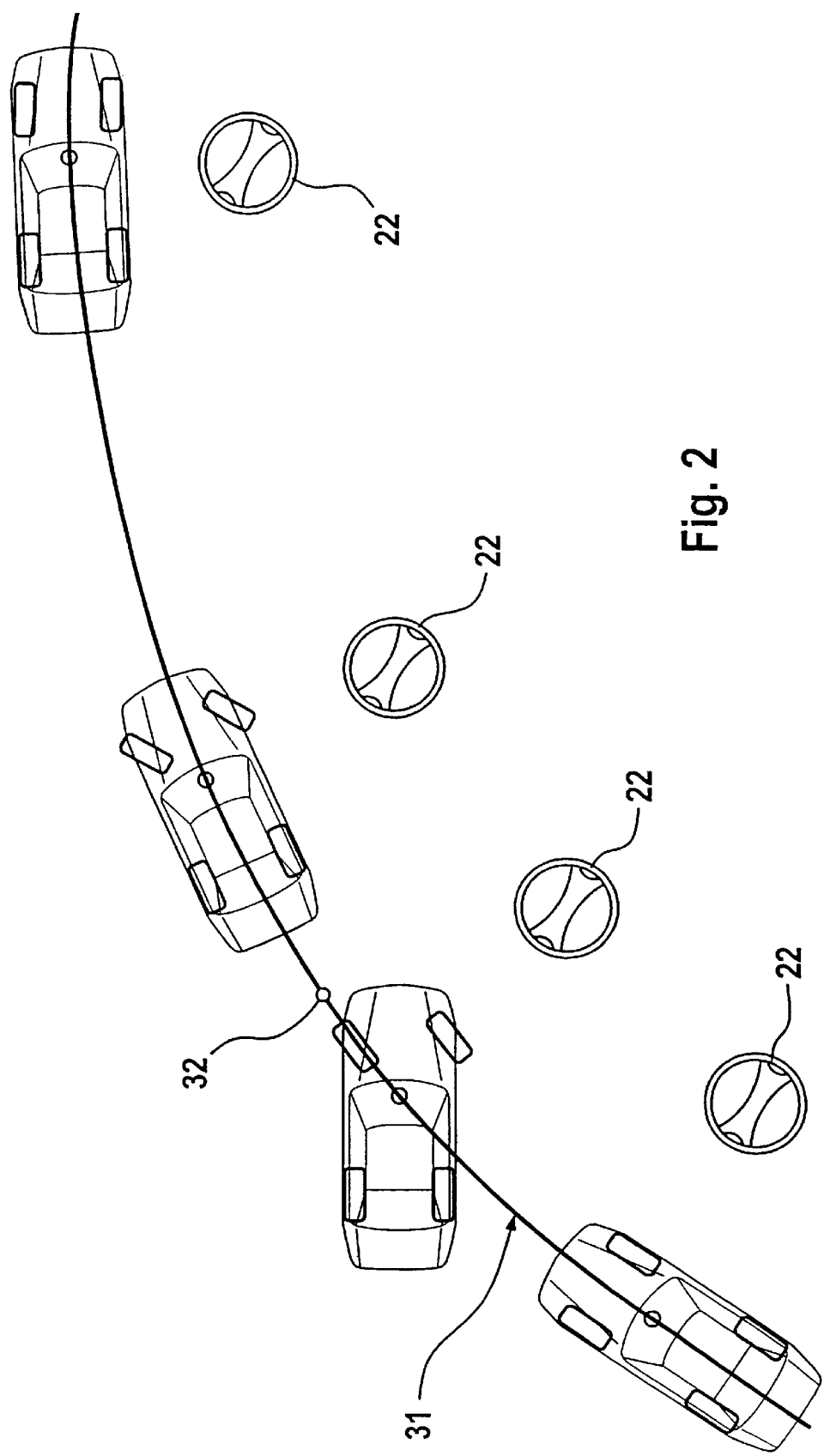
FIG. 2 is an exaggerated schematic view of an automatic steering intervention.
Figure 3:
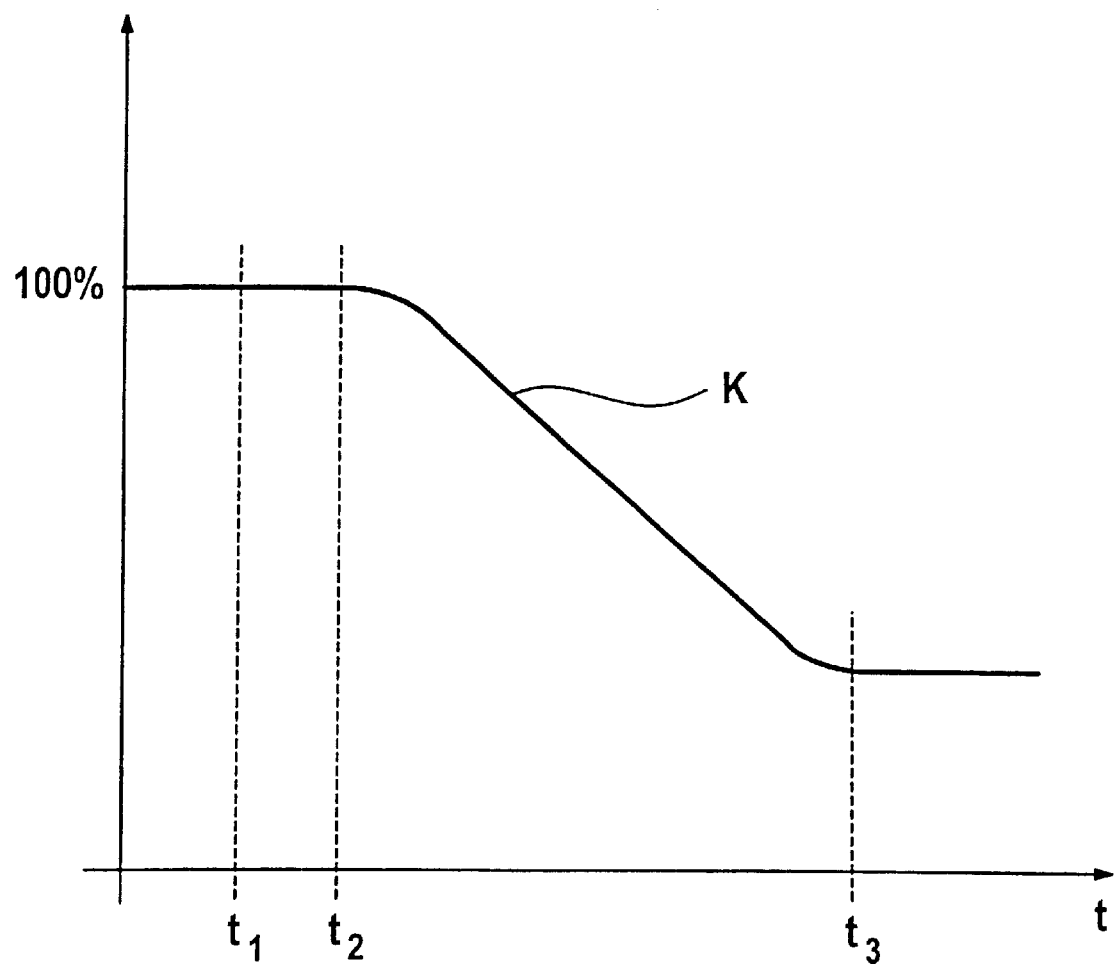
FIG. 3 is a graph illustrating the performance or handling capacity of the steering system according to the present invention in response to the occurrence of an error in the normal operating system.
Figure 4:
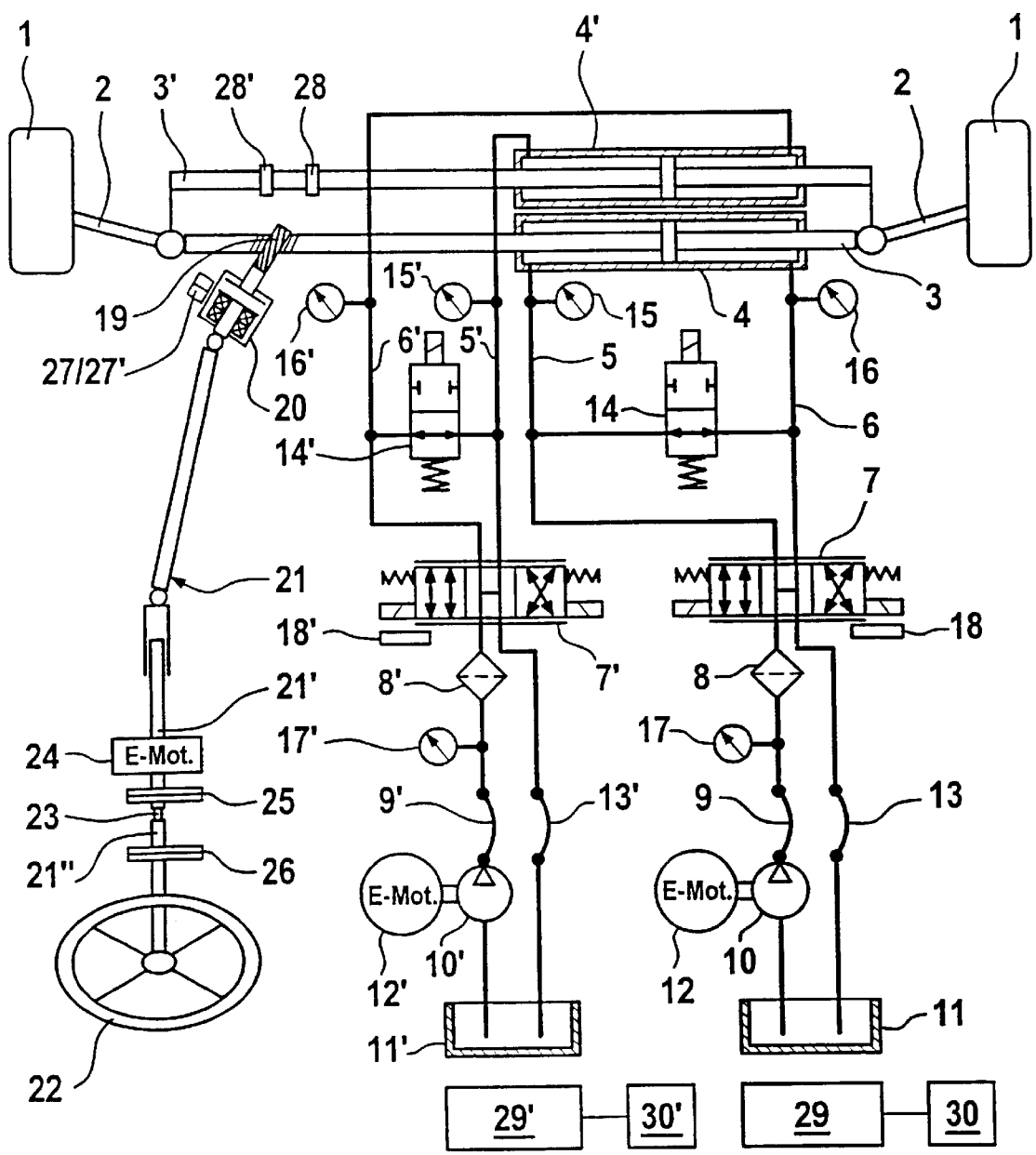
FIG. 4 is a schematic view of another example embodiment of the steering system according to the present invention.

FIGS. 2 and 3 illustrate the performance characteristics during the transitional phase.

FIG. 2 illustrates how the vehicle behaves when cornering during an automatic steering intervention or engagement.

As illustrated, the driver has actuated steering hand wheel 22 to effect a desired circular path 31. The curve radius and, thus, desired circular path 31 are able to be determined for control system 29 from the position of angle-of-rotation sensor 26, through which steering-angle setpoint value is indicated. If it should happen that the vehicle swerves out at this point in the manner illustrated, steered vehicles wheels 1 are automatically adjusted without the driver's intervention, such that the yawing of the vehicle about its normal axis is brought to a value corresponding to the value that exists given an essentially slip-free travel over circular path 31.

Now, if during this maneuver, for example at a position 32 on the travel path, an error should occur in control system 29 or within the hydraulic circuit controlled by control system 29, control 29' automatically assumes the steering actuation, i.e., the automatically initiated steering intervention is now continued by control system 29', without the driver being able to notice this directly. In the following, the performance characteristics of the steering system are then made to approximate a vehicle steering having positive coupling between steering hand wheel 22 and steered vehicle wheels 1.

The latter is illustrated in FIG. 3. For as long as the steering system works without errors, in accordance with curve K, all operating possibilities P of the steering system are given 100%.

As illustrated, at an instant $t_1$, a malfunction occurs in control system 29 and/or in the assigned hydraulic circuit. Control system 29', which is functioning by this time, still initially ensures 100% of the operating possibilities up to an instant $t_2$. In the transitional phase which is now setting in, these operating possibilities are successively withdrawn until the end of the transitional phase, at an instant $t_3$, when performance characteristics exist which are identical to those given a mechanical positive coupling between steering hand wheel 22 and steered vehicle wheels 1. This positive coupling is switched on at instant $t_3$.

In conclusion, therefore, the driver is given a reasonable re-adaptation period to become accustomed to the other steering performance of a steering operation involving mechanical positive coupling between steered vehicle wheels 1 and steering hand wheel 22. As a result, the driver will not be surprised by a sudden change in the performance characteristics of the vehicle's steering.

From instant $t_1$, on, the driver may additionally be warned acoustically or visually. If indicated, further measures may automatically be taken. The possibility exists, for example, to automatically throttle back on the maximum power output of the vehicle engine in order to reduce the attainable vehicle speeds.

Departing from the example embodiment described above, in some instances, a dual configuration of all sensor elements may be eliminated. For example, given a reliable enough example embodiment of angle-of-rotation sensors, the need for special angle-of-rotation sensors 25' and 26' may be eliminated. In such a case, both control systems 29 and 29' function only using sensors 25 and 26.

In some instances, the need may also be eliminated for one of electric motors 24 and 24', when motors having superior fail-safe properties are available. Furthermore, provision may be made to replace electric motor 12 with the vehicle engine with respect to the driving of pump 10.

In the above description, the assumption is made that control systems 29 and 29' are each combined with a hydraulic system, each hydraulic system having a piston-cylinder unit 4 and 4', respectively, for adjusting steered vehicle wheels 1. It is also possible, however, for differently functioning control units, such as electrical control units, to be employed and to be controlled by control systems 29 and 29' in accordance with the above explanations. In this context, the possibility also exists to combine a control system with a hydraulic control unit, and the other control system with a differently functioning control unit, such as with an electric motor.

In addition, seat-controlled electromagnetic valves 7 and 7' may be replaced, in principle, by any control valves at all, such as by linear or rotary-sleeve valves, which are able to be driven electrically or hydraulically.

Moreover, provision may be made to arrange piston-cylinder unit 4 and 4' on a common connecting rod 3 and/or to couple it thereto.

In place of the mechanical positive coupling of steering hand wheel 22 and steered vehicle wheels 1, which becomes active in the event of an emergency, a hydraulic positive coupling may also become active.

In the above described example embodiment illustrated in FIG. 2, it is provided in emergency mode, i.e., given switched-on positive coupling of steering hand wheel 22 and steered vehicle wheels 1, to employ electric motor 24' as a servomotor to minimize the manual torque that needs to be applied by the driver. Additionally or alternatively thereto, it may be provided to mount a conventional servo valve between coupling 20 and pinion 19—i.e., generally in the positive coupling between steering hand wheel 22 and steered vehicle wheels 1—, the servo valve being connected in an emergency mode to a hydraulic pressure source, e.g., to one of pumps 10 and 10', as well as to a relatively pressureless reservoir, e.g., 11 and 11', respectively, and to the two sides of a servomotor operatively coupled in terms of steering to the steered vehicle wheels, e.g., of one of piston-cylinder units 4 and 4'. Consequently, an, in principle, conventional steering including hydraulic servo or power assistance is available in the event of emergency mode.

What is claimed is:

1. A steering system for motor vehicles, comprising:
   a normal operating system;
   an emergency operating system configured to automatically become active in response to a malfunction of the normal operating system; and
   an auxiliary system at least substantially redundant to the normal operating system;
   wherein the normal operating system includes a steering-angle setpoint generator actuatable by a steering handle, a steering-angle actual-value sensor actuated by steered vehicle wheels, a motorized control unit configured to control the steered vehicle wheels, and a control system configured to control the control unit in accordance with a setpoint-actual value comparison of the steering angle;
   wherein, between the steering handle and steered vehicle wheels, the emergency operating system includes at least one of a mechanical and a hydraulic positive coupling which is active at least in response to emergency operation; and
   wherein the auxiliary system, in response to malfunctions in the normal operating system, is configured to automatically one of become and remain active and, in a transitional phase, is configured to adapt operating characteristics of a steering arrangement to the operating mode of the emergency system, the emergency system configured to become active when the transitional phase comes to an end.

2. The steering system according to claim 1, further comprising a manual-torque actuator configured to increasingly switch over to a manual torque that correlates to the emergency operating system in the transitional phase.

3. The steering system according to claim 1, wherein, at the end of the transitional phase, a straight-ahead position of the steered vehicle wheels corresponds to a predefined middle position of the steering handle.

4. The steering system according to claim 1, wherein the auxiliary system includes a control system in redundancy to the control system of the normal operating system.

5. The steering system according to claim 1, wherein at least one of the normal operating system and the auxiliary system includes electrical control units controllable by a respective control system.

6. The steering system according to claim 1, further comprising at least one of an optical, acoustical and haptical indicator configured to generate a signal indicative of a progression of the transitional phase.

7. The steering system according to claim 1, wherein the auxiliary system is configured completely redundantly relative to the normal operating system.

8. The steering system according to claim 7, wherein the normal operating system and the auxiliary system are configured redundantly relative to one another symmetrically.

9. The steering system according to claim 7, wherein the normal operating system and the auxiliary operating system are configured redundantly relative to one another asymmetrically.

10. The steering system according to claim 1, wherein at least one of the normal operating system and the auxiliary operating system includes a hydraulic control unit controlled by a respective control valve.

11. The steering system according to claim 10, wherein a switched-on emergency operating system includes a hydraulic control unit controllable by a servo valve mechanically controllable by forces.

12. The steering system according to claim 11, wherein the forces include torques in the emergency operating system.

13. The steering system according to claim 11, wherein, in a switched-off emergency operating system, the servo valve is electrically controllable by a control system of at least one of the normal operating system and the auxiliary system.

14. The steering system according to claim 11, wherein, in a switched-off emergency operating system, the servo valve is electromagnetically controllable by a control system of at least one of the normal operating system and the auxiliary system.

15. The steering system according to claim 11, wherein, in a switched-off emergency operating system, the servo valve is electromotively controllable by a control system of at least one of the normal operating system and the auxiliary system.

16. The steering system according to claim 1, wherein, in normal mode in accordance with predefinable operating phases, the emergency system is configured to be switched into action in parallel with the normal operating system.

17. The steering system according to claim 16, wherein, in normal mode, the emergency system is configured to be switched into action when forces necessary for a steering adjustment of the steered vehicle wheels one of reach and exceed maximum control unit forces generatable.

18. The steering system according to claim 1, wherein the steering system is configured so that changes in performance characteristics occurring in the transitional phase take place continuously.

19. The steering system according to claim 18, wherein the steering system is configured so that the changes in performance characteristics occurring in the transitional phase take place in small steps that a driver is able to have control over.

20. The steering system according to claim 1, wherein the auxiliary operating system is configured to continue automatic steering maneuvers and steering interventions initiated by at least one of the normal operating system and a system superordinate to the normal operating system and by the auxiliary operating system.

21. The steering system according to claim 20, further comprising an arrangement configured to generate a warning signal to prompt a driver to grip the steering handle at least in response to a malfunction in the normal operating system during one of an automatic steering maneuver and a steering intervention.

* * * * *

UNITED STATES PATENT AND TRADEMARK OFFICE
CERTIFICATE OF CORRECTION

PATENT NO.    : 6,612,393 B2
DATED         : September 2, 2003
INVENTOR(S)   : Bohner et al.

It is certified that error appears in the above-identified patent and that said Letters Patent is hereby corrected as shown below:

Column 5,
Line 21, before "which" insert -- 26 --.

Signed and Sealed this

Twenty-seventh Day of July, 2004

JON W. DUDAS
*Acting Director of the United States Patent and Trademark Office*